(12) United States Patent
Smith et al.

(10) Patent No.: US 12,544,781 B2
(45) Date of Patent: Feb. 10, 2026

(54) SYSTEM AND METHOD FOR AN AGRICULTURAL APPLICATOR

(71) Applicant: CNH Industrial America LLC, New Holland, PA (US)

(72) Inventors: Benjamin Smith, Brillion, WI (US); Roy A. Bittner, Reedsville, WI (US)

(73) Assignee: CNH Industrial America LLC, New Holland, PA (US)

(*) Notice: Subject to any disclaimer, the term of this patent is extended or adjusted under 35 U.S.C. 154(b) by 215 days.

(21) Appl. No.: 18/212,585

(22) Filed: Jun. 21, 2023

(65) Prior Publication Data
US 2024/0424513 A1    Dec. 26, 2024

(51) Int. Cl.
| | | |
|---|---|---|
| *B05B 12/08* | (2006.01) | |
| *A01C 23/04* | (2006.01) | |
| *A01G 25/09* | (2006.01) | |
| *A01G 25/16* | (2006.01) | |
| *A01M 7/00* | (2006.01) | |
| *B05B 12/00* | (2018.01) | |

(52) U.S. Cl.
CPC .......... *B05B 12/085* (2013.01); *A01C 23/042* (2013.01); *A01G 25/09* (2013.01); *A01G 25/16* (2013.01); *A01M 7/0092* (2013.01); *B05B 12/008* (2013.01)

(58) Field of Classification Search
CPC ... B05B 12/085; B05B 12/008; A01C 23/042; A01G 25/09; A01G 25/16; A01M 7/0092
See application file for complete search history.

(56) References Cited

U.S. PATENT DOCUMENTS

| | | | |
|---|---|---|---|
| 4,055,197 | A | 10/1977 | Raymond |
| 5,571,226 | A | 11/1996 | Kobayashi |
| 6,834,223 | B2 | 12/2004 | Strelioff et al. |
| 7,040,552 | B2 | 5/2006 | McCrea et al. |
| 9,394,922 | B2 | 7/2016 | Williamson et al. |
| 10,626,575 | B2 | 4/2020 | Kobayashi et al. |
| 10,730,359 | B2 | 8/2020 | Bittner et al. |
| 10,798,865 | B2 | 10/2020 | Fast et al. |
| 11,225,771 | B2 | 1/2022 | Okada et al. |
| 2006/0118654 | A1 | 6/2006 | Shivak |
| 2009/0308068 | A1 | 12/2009 | Yoshino |

(Continued)

FOREIGN PATENT DOCUMENTS

| | | |
|---|---|---|
| CN | 101798986 B | 9/2011 |
| CN | 110637801 B | 7/2021 |

(Continued)

OTHER PUBLICATIONS

Co-Pending U.S. Appl. No. 18/212,581, filed Jun. 21, 2023.

(Continued)

*Primary Examiner* — P. Macade Nichols
(74) *Attorney, Agent, or Firm* — Dority & Manning P.A.

(57) ABSTRACT

A system for a boom assembly can include a cylinder including a piston rod and a housing. The cylinder can be operably coupled between a first boom section and a second boom section of the boom assembly. A control circuit can be fluidly coupled with the cylinder. The control circuit includes a first pressure relief assembly including a first pressure relief valve and a first flow control device. The first flow control device can be positioned between the cylinder and the first pressure relief valve in the control circuit.

19 Claims, 11 Drawing Sheets

(56) References Cited

U.S. PATENT DOCUMENTS

| | | | |
|---|---|---|---|
| 2014/0263766 A1* | 9/2014 | Venton-Walters | A01C 23/047 403/53 |
| 2017/0164599 A1* | 6/2017 | Ito | B05B 13/005 |
| 2021/0195886 A1 | 7/2021 | Smith | |
| 2022/0142141 A1 | 5/2022 | Sullivan | |
| 2022/0143632 A1 | 5/2022 | Bharatiya et al. | |
| 2022/0211027 A1 | 7/2022 | Van Poucke et al. | |
| 2022/0225602 A1 | 7/2022 | Grosse Prues | |
| 2022/0287289 A1 | 9/2022 | de Andrade Alves et al. | |
| 2022/0369531 A1 | 11/2022 | Anderson | |
| 2022/0386588 A1 | 12/2022 | Dumont et al. | |

FOREIGN PATENT DOCUMENTS

| | | |
|---|---|---|
| DE | 102020118528 A1 | 1/2022 |
| EP | 2589289 B1 | 10/2018 |
| JP | H09158903 A | 6/1997 |
| JP | H11293712 A | 10/1999 |
| JP | 3609301 B2 | 1/2005 |
| JP | 4368508 B2 | 11/2009 |
| KR | 101486256 B1 | 1/2015 |
| WO | WO2017029349 A1 | 2/2017 |
| WO | WO2021037517 A1 | 3/2021 |

OTHER PUBLICATIONS

Co-Pending U.S. Appl. No. 18/212,584, filed Jun. 21, 2023.
Co-Pending U.S. Appl. No. 18/212,585, filed Jun. 21, 2023.
Spears, Pressure Relief Valve Sizing, 2015, 6 Pages. Retrieved Aug. 10, 2023 from Webpage: https://www.bre.com/Blog/Pressure-Relief-Valve-Sizing.aspx.

* cited by examiner

SYSTEM AND METHOD FOR AN AGRICULTURAL APPLICATOR

FIELD

The present disclosure generally relates to agricultural implements and, more particularly, to systems and methods for spray operations.

BACKGROUND

Various types of vehicles utilize applicators (e.g., vehicles, floaters, etc.) to deliver an agricultural product to a ground of a field. The agricultural product may be in the form of a solution or mixture, with a carrier (such as water) being mixed with one or more active ingredients (such as an herbicide, fertilizer, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

During a spray operation, the vehicle drives over a target to direct the agricultural product at the target. However, the various factors may cause the boom arm to move thereby placing various sections of the boom arms at heights that are varied from a defined height above the target. Accordingly, a vehicle that is capable of altering a height of the boom assembly would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for a boom assembly that includes a cylinder including a piston rod and a housing. The cylinder is operably coupled between a first boom section and a second boom section of the boom assembly. A control circuit is fluidly coupled with the cylinder. The control circuit includes a first pressure relief assembly including a first pressure relief valve and a first flow control device, the first flow control device positioned between the cylinder and the first pressure relief valve in the control circuit.

In some aspects, the present subject matter is directed to a method for an operation of a system for a boom assembly. The method includes receiving, from a computing system, instructions to set a first pressure relief valve at a first defined pressure setpoint. The method also includes restricting flow of a hydraulic fluid between a cylinder and the first pressure relief valve with a first flow control device.

In some aspects, the present subject matter is directed to a system that includes a cylinder including a piston rod and a housing. The cylinder is operably coupled between a first boom section and a second boom section of a boom assembly. A control circuit is fluidly coupled with the cylinder. The control circuit includes a first pressure relief valve and a first restrictive orifice positioned between the cylinder and the first pressure relief valve.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
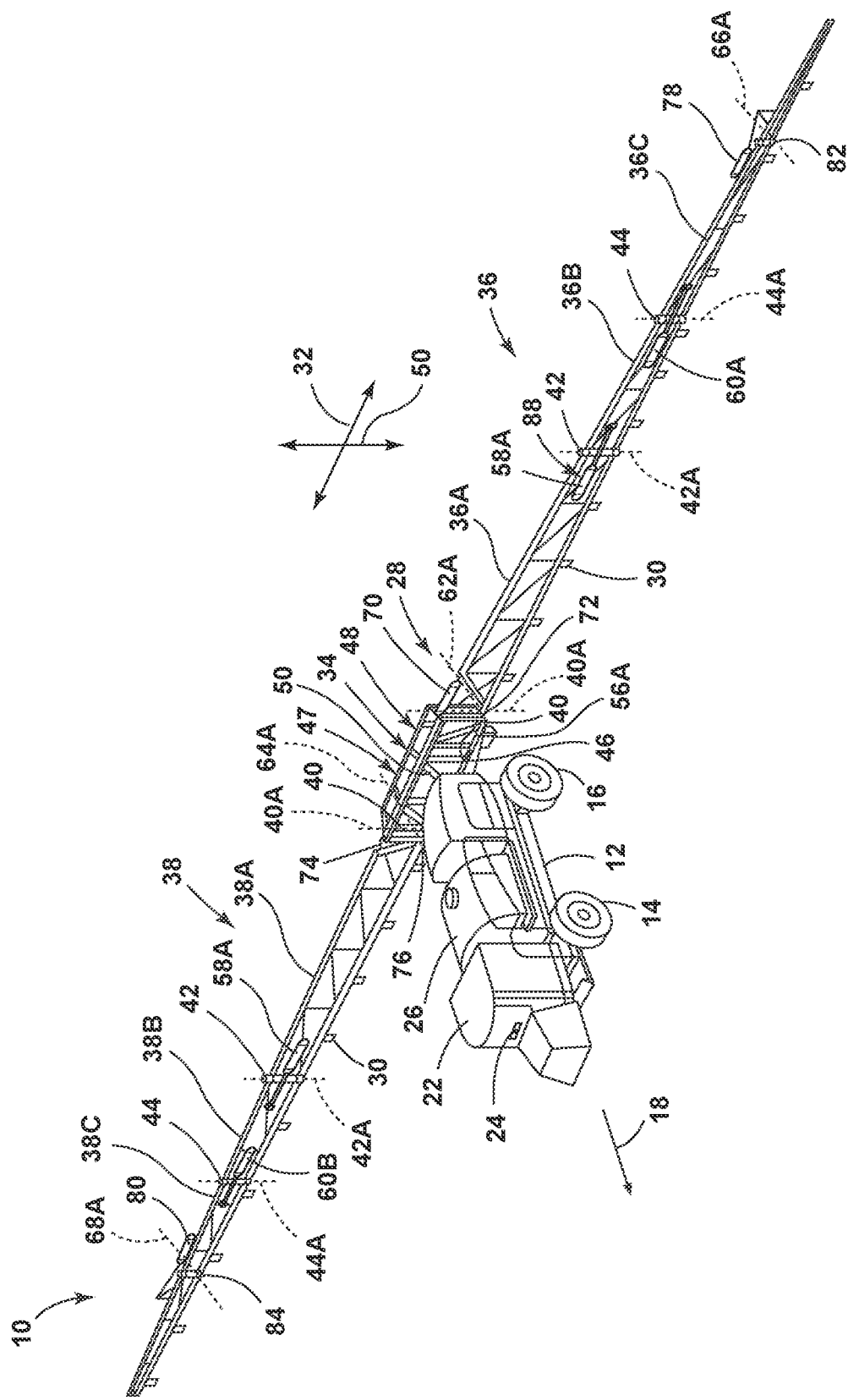
FIG. 1 illustrates a front perspective view of a vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the defined functionality is achieved, irrespective of architectures or intermedial components. Likewise, any two components so associated can also be viewed as being "operably connected" or "operably coupled" to each other to achieve the defined functionality, and any two components capable of being so associated can also be viewed as being "operably couplable" to each other to achieve the defined functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination; A and C in combination: B and C in combination: or A, B, and C in combination.

In general, the present subject matter is directed to a system for a boom assembly that includes a cylinder including a piston rod and a housing. The cylinder can be operably coupled between a first boom section and a second boom section of the boom assembly and configured to alter a relative position between the first boom section and the second boom section.

A control circuit can be fluidly coupled with the cylinder. Fluid from the control circuit fluidly coupled with a reservoir entering a base port of the cylinder (and exiting a rod port of the cylinder) causes the piston rod to extend, and fluid from the reservoir entering the rod port of the cylinder (and exiting the base port of the cylinder) causes the piston rod to retract. In some cases, the control circuit can include a first pressure relief assembly including a first pressure relief valve and a first flow control device. The first flow control device can be positioned between the cylinder and the first pressure relief valve in the control circuit. In several examples, the first flow control device may be configured to vary back pressure between the cylinder and the first relief valve. In some cases, the control circuit may be limited by the time it takes for the computing system and the first relief valve to ramp up to target outputs and/or settings, which may create a lapse of target hydraulic pressure to counteract inertial forces within the boom assembly. Once the inertial load is transferred to the cylinder, the spike in flow is mitigated by the first flow control device so that the natural back pressure supplements cylinder forces. As such, by combining the first pressure relief valve with the first flow control device, a lapse in dampening in any scenario may be mitigated or prevented.

Figure 2:
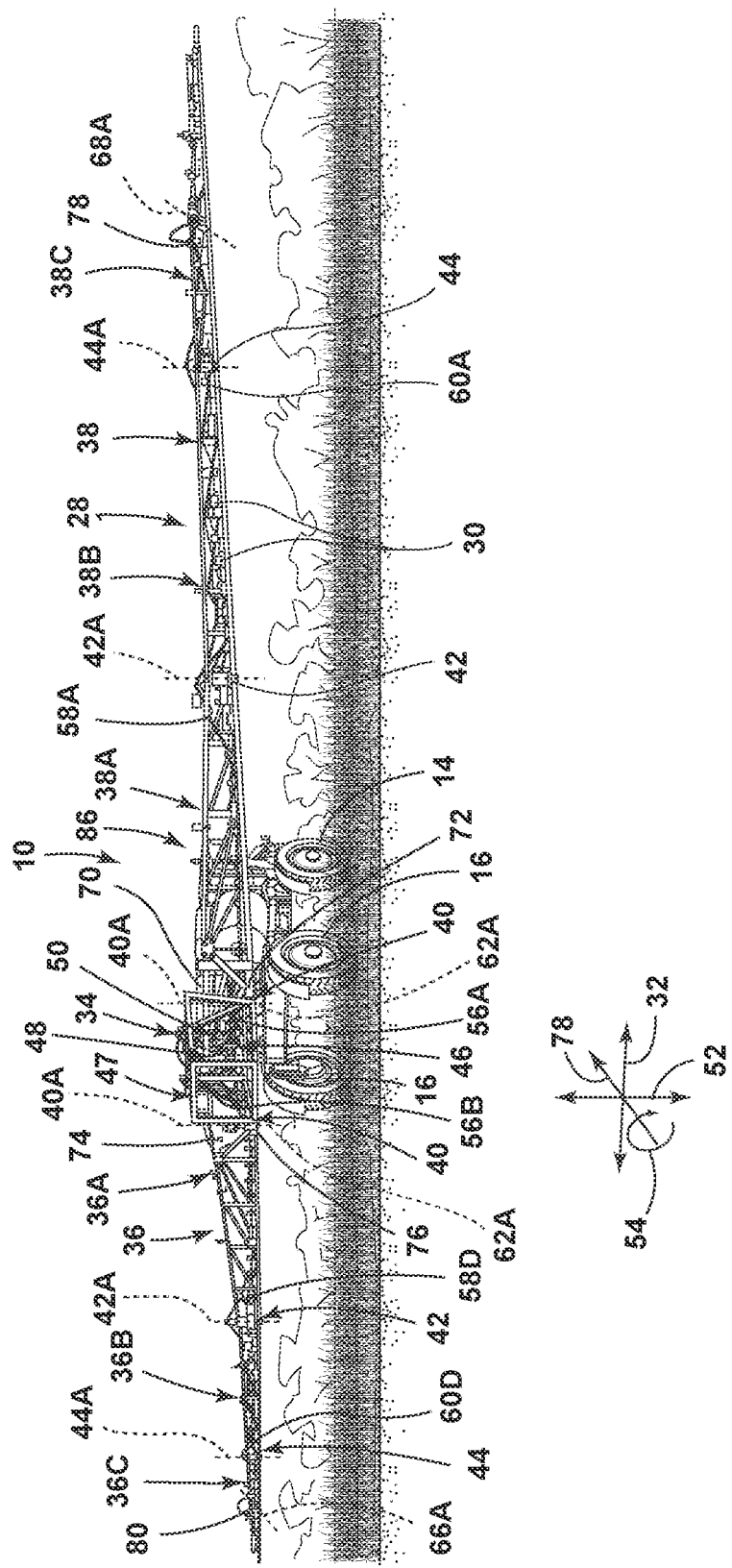
FIG. 2 illustrates a rear perspective view of the vehicle in accordance with aspects of the present subject matter.
Figure 3:
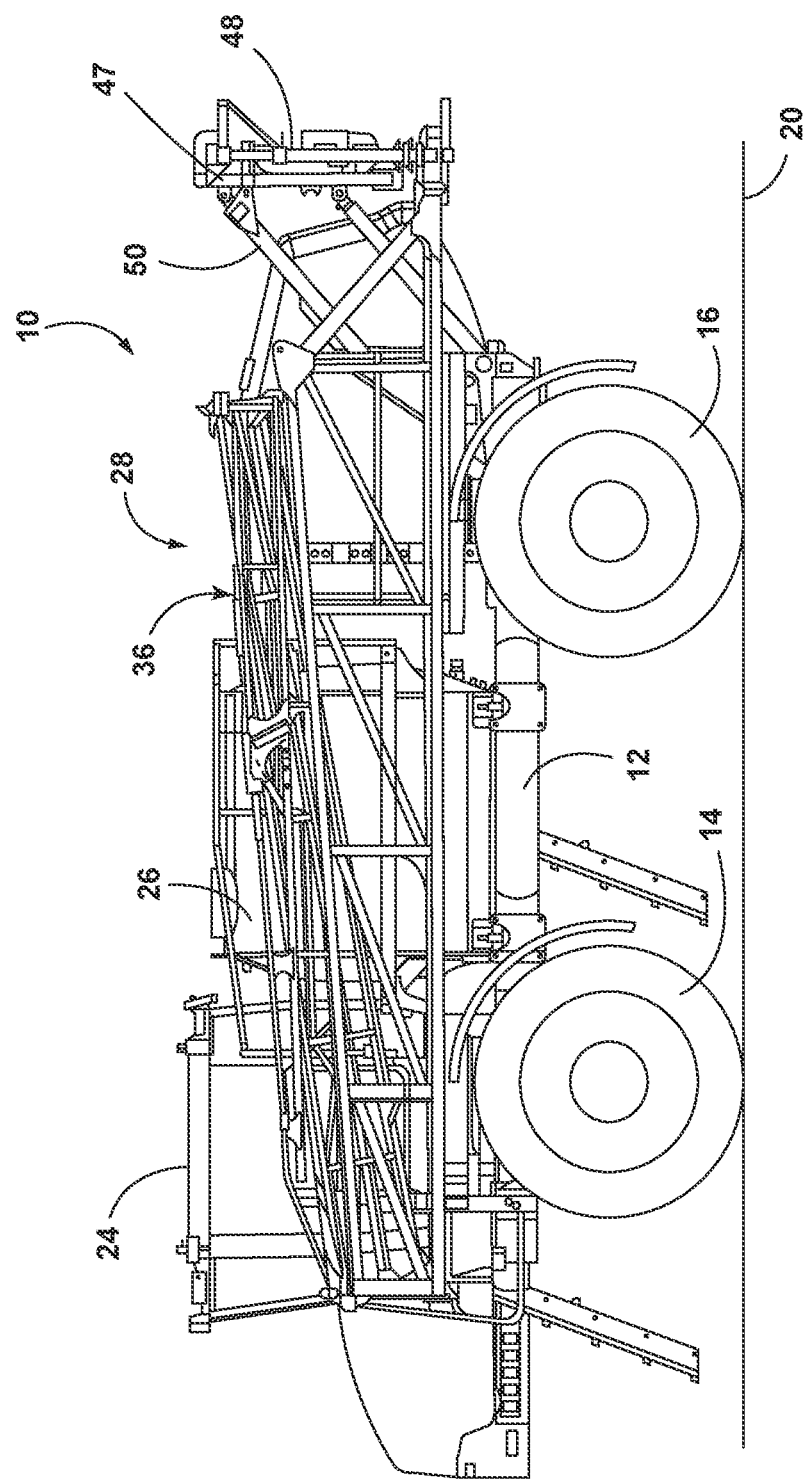
FIG. 3 illustrates a side view of the vehicle in accordance with aspects of the present subject matter.

Referring now to FIGS. 1-3, differing views of a vehicle 10 are illustrated in accordance with aspects of the present subject matter. As shown, FIG. 1 illustrates a front perspective view of the vehicle with a boom assembly in a working or unfolded position, FIG. 2 illustrates a rear perspective view of the vehicle with a boom assembly in a working or unfolded position, and FIG. 3 illustrates a side view of the vehicle with a boom assembly in a transport or folded position. In the illustrated examples, the vehicle is configured as a self-propelled vehicle. However, in alternative embodiments, the vehicle may be configured as any other suitable type of vehicle configured to perform agricultural spraying operations, such as a tractor or other vehicle configured to haul a spraying or application implement.

As shown in FIGS. 1 and 2, the vehicle 10 may include a chassis 12 or frame configured to support or couple to a plurality of components. For example, front wheels 14 and rear wheels 16 may be coupled to the chassis 12. The wheels 14, 16 may be configured to support the vehicle 10 relative to the ground 20 and move the vehicle 10 in a direction of travel (e.g., as indicated by arrow 18 in FIG. 1) across the ground 20.

The chassis 12 may also support an operator's cab 22 that houses various control or input devices (e.g., levers, pedals, control panels, buttons, and/or the like) for permitting an operator to control the operation of the work vehicle 10. For instance, as shown in FIG. 1, the vehicle 10 may include a human-machine or user interface 24 for displaying message windows and/or alerts to the operator and/or for allowing the operator to interface with the vehicle's controller or computing system.

Furthermore, the chassis 12 may also support one or more tanks 26, which may be in the form of a product tank and/or an auxiliary tank. Each product tank is generally configured to store or hold an agricultural product, such as a pesticide, an herbicide, a nutrient, and/or the like. The auxiliary tank may be configured to store or hold clean water and/or any other product, which may be different from the agricultural product within the product tank.

The chassis 12 may further support a frame or boom assembly 28 operably mounted to the chassis 12. A plurality of nozzle assemblies 30 are mounted on the boom assembly 28 and configured to selectively dispense the agricultural product stored in the one or more tanks 26 via the nozzle assemblies 30 onto underlying plants and/or soil. The nozzle assemblies 30 are generally spaced apart from each other on the boom assembly 28 along a lateral direction 32. Furthermore, fluid conduits may fluidly couple the nozzle assemblies 30 to the tank(s) 26. Each nozzle assembly 30 may include a nozzle valve and an associated spray tip or spray nozzle. In several embodiments, the operation of each nozzle valve may be individually controlled by an associated controller or computing system such that the valve regulates the flow rate and/or another spray characteristic of the agricultural product through the associated spray nozzle.

As shown in FIGS. 1 and 2, in various embodiments, the boom assembly 28 includes a central boom section 34, a left boom arm 36, and a right boom arm 38. The left boom arm 36 includes a left inner boom section 36A pivotably coupled to the central boom section 34, a left middle boom section 36B pivotably coupled to the left inner boom section 36A, and a left outer boom section 36C pivotably coupled to the left middle boom section 36B. Similarly, the right boom arm 38 includes a right inner boom section 38A pivotably coupled to the central boom section 34, a right middle boom section 38B pivotably coupled to the right inner boom section 38A, and a right outer boom section 38C pivotably coupled to the right middle boom section 38B. Each of the inner boom sections 36A, 38A is pivotably coupled to the central boom section 34 at pivot joints 40. Similarly, the middle boom sections 36B, 38B are pivotably coupled to the respective inner boom sections 36A, 38A at pivot joints 46 while the outer boom sections 36C, 38C are pivotably coupled to the respective middle boom sections 36B, 38B at pivot joints 44.

The pivot joints 40, 42, 44 may be configured to allow relative pivotal motion between adjacent boom sections of the boom assembly 28. For example, the pivot joints 40, 42, 44 may allow for articulation of the various boom sections between a fully extended or working position (e.g., as shown in FIGS. 1 and 2), in which the boom sections are unfolded along the lateral direction 32 to allow for the performance of an agricultural spraying operation, and a transport position (FIG. 3), in which the boom sections are folded inwardly to reduce the overall width of the boom assembly 28 along the lateral direction 32. It will be appreciated that, although the boom assembly 28 is shown in FIGS. 1-3 as including a central boom section and three individual boom sections coupled to each side of the central boom sections, the boom assembly 28 may generally have any suitable number of boom sections. For example, in other embodiments, each boom arm 36, 38 may include four or more boom sections or less than three boom sections.

In some embodiments, the boom assembly 28 may include a mast 47 coupled to a frame 48 that, in combination, can support the boom assembly 28 relative to the vehicle chassis 12. For example, the frame 48 can be coupled to the mast 47 via a linkage configured to transfer the downward load 52 of the frame 48 to the mast 47. For instance, the weight of the first and second boom arms 36, 38 is supported by the frame 48, and the frame 48 transfers the load to the mast 47 via the linkage. The mast 47, in turn, transfers the load to the vehicle chassis 12 via the linkage assembly, thereby suspending the boom assembly 28 above the ground 20. Furthermore, the linkage may experience rotation of the frame 48 relative to the mast 47 about an axis parallel to the direction of travel 18. For example, if the vehicle 10 tilts to one side due to variations in the terrain, the boom may rotate about the axis, illustrated by rotational line 54.

In various examples, the linkage can include one or more actuators 50 that is configured to rotate the frame 48 relative to the mast 47, which may be performed to counteract the rotation of the boom assembly 28. Additionally or alternatively, the one or more actuators 50 may be configured to adjust the height of the boom assembly 28 relative to the chassis 12 of the vehicle 10 may be adjusted by one or more actuators 50 operably coupled with the boom assembly 28 and the chassis 12. In some instances, the height may be adjusted along an axis, as generally illustrated by line 52 in FIG. 2.

Additionally, as shown in FIGS. 1 and 2, the boom assembly 28 may include inner fold actuators 56A, 56B coupled between the inner boom sections 36A, 38A and the central boom section 34 to enable pivoting or folding between the fully-extended working position and the transport position. For example, by retracting/extending the inner fold actuators 56A, 56B, the inner boom sections 36A, 38A may be pivoted or folded relative to the central boom section 34 about a pivot axis 40A respectively defined by the pivot joints 40. Moreover, the boom assembly 28 may also include middle fold actuators 58A, 58B coupled between each inner boom section 36A, 38A and its adjacent middle boom section 36B, 38B and outer fold actuators 60A, 60B coupled between each middle boom section 36B, 38B and its adjacent outer boom section 36C, 38C. As such, by retracting/extending the middle and outer fold actuators 58A, 58B, 60A, 60B, each middle and outer boom section 36B, 38B, 36C, 38C may be pivoted or folded relative to its respective inwardly adjacent boom section 36A, 38A, 36B, 38B about a respective pivot axis 42A, 44A.

In various examples, the boom assembly 28 may move relative to one or more yaw-related pivot axes. For instance, the boom assembly 28 may rotate relative to a left yaw axis and/or a right yaw axis, either of which may be affected by one or more of the pivot axes 40A, 42A, 46A. In various instances, the fold actuators 56A, 56B, 58A, 58B, 60A, 60B may be adjusted to mitigate the yaw-related movement.

With further reference to FIGS. 1-3, the boom assembly 28 may additionally or alternatively be configured to move various boom sections relative to one another and/or relative to chassis 12 about a relative roll axis 52, 54, 62A, 64A, 66A, 68A. In the illustrated examples, the boom assembly 28 may be affected by the positions of the various sections relative to one another about the roll axis 54 for the central boom section 34, the lift axis 52 for the central boom section 34, the left main shoulder pivot axis 62A, the right main shoulder pivot axis 64A, a left tertiary shoulder pivot axis 66A, and/or a right tertiary shoulder pivot axis 68A.

For example, as shown in FIGS. 1 and 2, a lift actuator 70 may be positioned between the left inner boom section 36A and the central boom section 34. As a result, the lift actuator 70 can be configured to drive rotation of the left inner boom section 36A relative to the central boom section 34 about the roll axis 62A. In some instances, a first rotation assembly 72 is mounted between the left inner boom section 36A and the central boom section 34 and defines the roll axis 62A. As such, the first rotation assembly 72 may be configured to enable rotation of the left inner boom section 36A in response to the actuation of the lift actuator 70.

In addition, a lift actuator 74 may be positioned between the right inner boom section 38A and the central boom section 34. As a result, the lift actuator 74 can be configured to drive rotation of the right inner boom section 38A relative to the central boom section 34 about a roll axis 64A. In some instances, a second rotation assembly 76 is mounted between the right inner boom section 38A and the central boom section 34 and defines the roll axis 64A. As such, the second rotation assembly 76 may be configured to enable rotation of the right inner boom section 38A in response to the actuation of the lift actuator 74.

Further, respective lift actuators 78, 80 may be positioned between each middle boom section 36B, 38B and its adjacent outer boom section 36C, 38C. As a result, the lift actuators 78, 80 can be configured to drive rotation, with respective third and fourth rotation assemblies 82, 84 of each middle boom section 36B, 38B and its adjacent outer boom section 36C, 38C about respective roll axes 66A, 68A. In some instances, third and fourth rotation assemblies 82, 84 can be respectively mounted between each middle boom section 36B, 38B and its adjacent outer boom section 36C, 38C and respectively define the roll axes 66A, 68A. As such, the third and fourth rotation assemblies 82, 84 may be configured to enable rotation of each middle boom section 36B, 38B and its adjacent outer boom section 36C, 38C in response to the actuation of the respective lift actuator 78, 80.

In various examples, any of the actuators 56A, 56B, 58A, 58B, 60A, 60B, 70, 74, 78, 80 described herein may be configured as hydraulic cylinders. However, it will be appreciated that different actuators 56A, 56B, 58A, 58B, 60A, 60B, 70, 74, 78, 80 may be used in other embodiments. For example, any of the actuators 56A, 56B, 58A, 58B, 60A, 60B, 70, 74, 78, 80 may be configured as electric actuators, pneumatic cylinders, pulley systems, and/or any other practicable device. Moreover, in certain embodiments, the rotation elements 56A, 56B may be configured as hinges. However, in other embodiments, the rotation elements 56A, 56B may include flexible connection members (e.g., expansion joints), cross joints, additional actuators, and/or any other practicable assembly.

With further reference to FIGS. 1-3, the vehicle 10 may also include a sensor system 86. In general, the sensor system 86 may be configured to capture data indicative of one or more operating conditions or parameters associated with the performance and/or operation of the vehicle 10, a system operably coupled with the vehicle 10, an assembly operably coupled with the vehicle 10, such as the boom assembly 28. The sensor system 86 may include one or more sensors 88, a weather station, and/or any other assembly, which may be installed on the vehicle 10 and/or the boom assembly 28. For instance, in some embodiments, the one or more sensors 88 may be installed on the boom assembly 28 to allow operating parameters/conditions associated with the boom assembly 28 to be monitored. However, in other embodiments, one or more sensors 88 may be installed relative to or in association with any other suitable components, features, systems, and/or sub-systems of the vehicle 10. In various examples, the sensors 88 may include position sensors, flow sensors, motion sensors (e.g., accelerometers, gyroscopes, etc.), image sensors (e.g., cameras, LIDAR devices, etc.), radar sensors, ultrasonic sensors, and/or the like, depending on the operating conditions being monitored.

In several examples, the sensor system 86 can include a first set of one or more sensors 88 that is configured to detect a height of the boom assembly 28 relative to the ground 20 at a defined location on the boom assembly 28. In some cases, the first set of sensors 88 can include eight (or more or less) sensors 88 spaced apart from one another along the boom assembly 28. Based on the data captured from each of the first set of sensors 88, a ground profile of the boom assembly 28 may be determined.

Additionally or alternatively, the sensor system 86 can include a second set of one or more sensors 88 that are configured to detect a position of the various sections of the boom assembly 28 relative to another. As provided herein, the boom assembly 28 may be affected by the positions of the various sections relative to one another about the roll axis 54 for the central boom section 34, the lift axis 52 for the central boom section 34, the left main shoulder pivot axis 62A, the left main shoulder pivot axis 64A, a left tertiary shoulder pivot axis 66A, and/or a right tertiary shoulder pivot axis 68A. In some cases, the second set of sensors 88 can be operably coupled with any of the axes 40A, 42A, 46A, 52, 54, 62A, 64A, 66A, 68A and configured to determine a position of the various sections of the boom assembly 28 relative to one another. Based on the data captured from each of the second set of sensors 88, a position profile of the boom assembly 28 may be determined.

Additionally or alternatively, the sensor system 86 can include a third set of one or more sensors 88 that is configured to detect a weight of the boom assembly 28 or sections thereof. In some cases, the third set of sensors 88 can include one or more pressure transducers that can be positioned on the central boom section 34 of the boom assembly 28, and/or operably coupled with the lift actuator 70, 74 of the first boom arm and/or the second boom arm.

Figure 4:
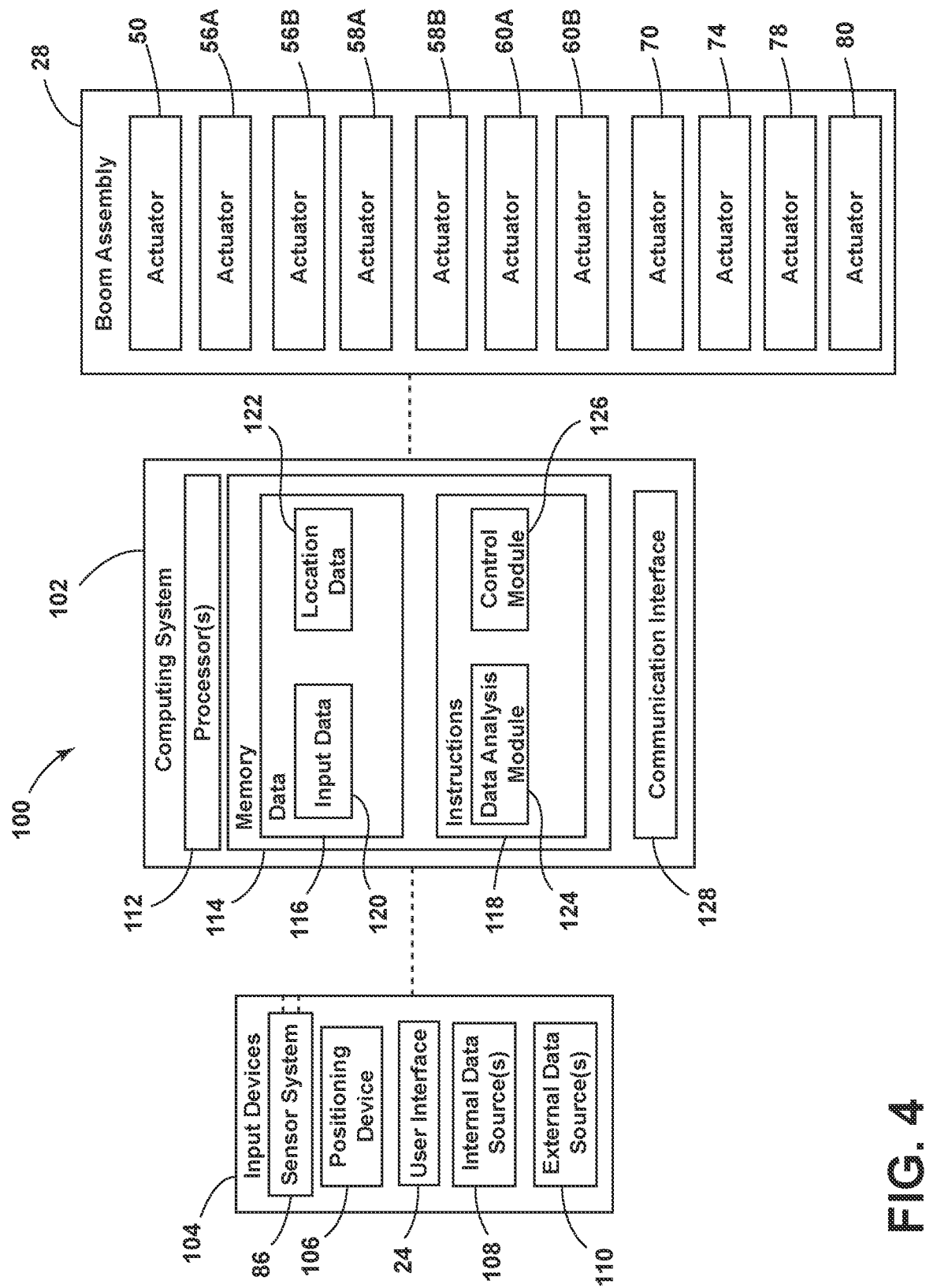
FIG. 4 illustrates a schematic diagram of a vehicle system in accordance with aspects of the present subject matter.
Figure 7:
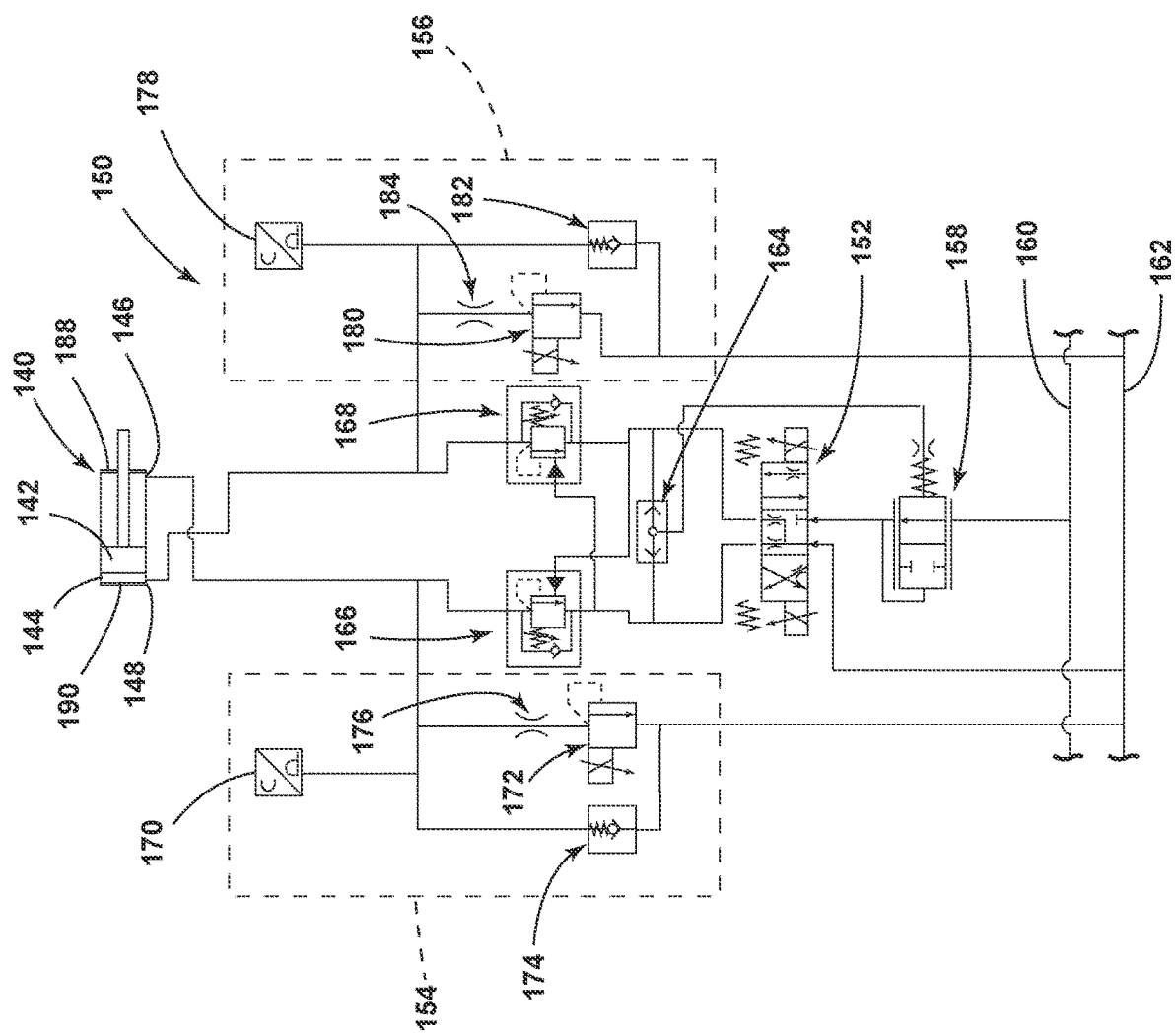
FIG. 7 illustrates a hydraulic control circuit operably coupled with an actuator of a boom assembly in accordance with aspects of the present subject matter.

Referring to FIG. 4, when the boom assembly 28 is in the extended position (as illustrated in FIGS. 1 and 2), the position of various sections of the boom assembly 28 may be affected due to the movement of various sections of the boom assembly 28. For instance, the boom assembly 28 may be affected by the positions of the various sections relative to the roll axis 54 for the central boom section 34, the lift axis 52 for the central boom section 34, the left main shoulder pivot axis 62A, the right main shoulder pivot axis 64A, a left tertiary shoulder pivot axis 66A, and/or a right tertiary shoulder pivot axis 68A. As provided herein, movement about each axis may be controlled via an actuator 56A, 56B, 58A, 58B, 60A, 60B, 70, 74, 78, 80. In some cases, each actuator 56A, 56B, 58A, 58B, 60A, 60B, 70, 74, 78, 80 may be a hydraulic cylinder that may be driven via an independent hydraulic control circuit 150 (FIG. 7). Due to the configuration of the boom assembly 28, the actuation of one actuator 56A, 56B, 58A, 58B, 60A, 60B, 70, 74, 78, 80 can impact the manner in which one or more of the other actuators 56A, 56B, 58A, 58B, 60A, 60B, 70, 74, 78, 80 may be controlled to maintain the boom assembly 28 at the defined position relative to the ground 20, which may be based on the ground profile and/or the position profile. As such, the vehicle 10 may include a system 100 that is configured to determine a position (e.g., a stroke length) for each actuator 56A, 56B, 58A, 58B, 60A, 60B, 70, 74, 78, 80 based on an impact to one or more remaining actuators 56A, 56B, 58A, 58B, 60A, 60B, 70, 74, 78, 80 to maintain the boom assembly 28 at a defined position relative to the ground 20.

With further reference to FIG. 4, the system 100 will be described with reference to the vehicle 10 described above with reference to FIGS. 1-3. However, it should be appreciated by those of ordinary skill in the art that the disclosed system 100 may generally be utilized with agricultural machines having any other suitable machine configuration.

As shown in FIG. 4, the system 100 can include a computing system 102 operably coupled with various input devices 104 and one or more actuators 56A, 56B, 58A, 58B, 60A, 60B, 70, 74, 78, 80 within the boom assembly 28. In general, the computing system 102 may correspond to any suitable processor-based device(s), such as a computing device or any combination of computing devices. For example, the computing system 102 may generally include one or more processor(s) 112 and associated memory devices 114 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 114 may generally include memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114 may generally be configured to store information accessible to the processor(s) 112, including data 116 that can be retrieved, manipulated, created, and/or stored by the processor(s) 112 and instructions 118 that can be executed by the processor(s) 112.

In several embodiments, the data 116 may be stored in one or more databases. For example, the memory 114 may include an input database 120 for storing input data received from the input device(s). For example, the input device(s) may include the sensor system 86, which includes one or more sensors 88 configured to monitor one or more conditions associated with the vehicle 10 and/or the operation being performed therewith (e.g., including one or more of the various sensors 88, described above), one or more positioning device(s) 106 for generating position data associated with the location of the vehicle 10, one or more user interfaces 24 for allowing operator inputs to be provided to the computing system 102 (e.g., buttons, knobs, dials, levers, joysticks, touch screens, and/or the like), one or more other internal data sources 108 associated with the vehicle 10 (e.g., other devices, databases, etc.), one or more external data sources 110 (e.g., a remote computing device or server), and/or any other suitable input device(s). The data received from the input device(s) may, for example, be stored within the input database 120 for subsequent processing and/or analysis. It will be appreciated that, in addition to being considered an input device(s) that allows an operator to provide inputs to the computing system 102, the user interface 24 may also function as an output device. For example, the user interface 24 may be configured to allow the computing system 102 to provide feedback to the operator (e.g., visual feedback via a display or other presentation device, audio feedback via a speaker or other audio output device, and/or the like).

Moreover, in several embodiments, the memory 114 may also include a location database 122 storing location information about the vehicle 10 and/or information about the ground 20 being processed (e.g., a field map). Such location database 122 may, for example, correspond to a separate database or may form part of the input database 120. As shown in FIG. 4, the computing system 102 may be communicatively coupled to the positioning device(s) 106 installed on or within the vehicle 10. For example, in some embodiments, the positioning device(s) 106 may be configured to determine the location of the vehicle 10 using a satellite navigation position system (e.g., a GPS, a Galileo positioning system, the Global Navigation satellite system (GLONASS), the BeiDou Satellite Navigation and Positioning system, and/or the like). In such an embodiment, the location determined by the positioning device(s) 106 may be transmitted to the computing system 102 (e.g., in the form of coordinates) and subsequently stored within the location database 122 for subsequent processing and/or analysis.

Additionally, in several embodiments, the location data stored within the location database 122 may also be correlated to all or a portion of the input data stored within the input database 120. For instance, in some embodiments, the location coordinates derived from the positioning device(s) 106 and the data received from the input device(s) may both be time-stamped. In such an embodiment, the time-stamped data may allow the data received from the input device(s) to be matched or correlated to a corresponding set of location coordinates received from the positioning device(s) 106, thereby allowing the precise location of the portion of the ground 20 associated with the input data to be known (or at least capable of calculation) by the computing system 102.

Moreover, by matching the input data to a corresponding set of location coordinates, the computing system 102 may also be configured to generate or update a corresponding field map associated with the ground 20 being processed. For example, in instances in which the computing system 102 already includes a field map stored within its memory 114 that includes location coordinates associated with various points across the ground 20, the input data received from the input device(s) may be mapped or correlated to a given location within the field map. Alternatively, based on the location data and the associated image data, the computing system 102 may be configured to generate a field map for the ground 20 that includes the geo-located input data associated therewith.

Referring still to FIG. 4, in several embodiments, the instructions 118 stored within the memory 114 of the computing system 102 may be executed by the processor(s) 112 to implement a data analysis module 124. In general, the data analysis module 124 may be configured to analyze the input data (e.g., a set of input data received at a given time or within a given time period or a subset of the data, which may be determined through a pre-processing method) to determine the current one or more operating parameters or conditions of the boom assembly 28 using any algorithm and/or data processing technique. In various examples, the data analysis module 124 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 102 and may be used to generate subsequent instructions.

In some examples, the data analysis module 124 may receive the input data from one or more input devices 104. In turn, the system 100 may determine a current boom profile based on boom position data and defined boom dimensions/a defined boom geometry. Additionally, the system 100 may determine relative positions at various locations along the boom assembly 28 based on boom height data. In some examples, the system 100 may further calculate a ground profile based on the boom height data. The system 100 may further determine a target boom profile based on the current ground profile. Further, the system 100 may calculate a defined position for one or more actuators 56A, 56B, 58A, 58B, 60A, 60B, 70, 74, 78, 80 of the boom assembly 28 (e.g., a stroke length for each cylinder) to achieve the defined boom profile. In some instances, the defined position for one or more of the actuators 56A, 56B, 58A, 58B, 60A, 60B, 70, 74, 78, 80 of the boom assembly 28 may be based at least partially on an effect of movement of a first actuator of the one or more actuators 56A, 56B, 58A, 58B, 60A, 60B, 70, 74, 78, 80 on a second actuator of the one or more actuators 56A, 56B, 58A, 58B, 60A, 60B, 70, 74, 78, 80 (or the remaining actuators of the one or more actuators) to maintain the boom assembly 28 at the defined position relative to the ground 20.

Referring still to FIG. 4, the instructions 118 stored within the memory 114 of the computing system 102 may also be executed by the processor(s) 112 to implement a control module 126. In general, the control module 126 may be configured to adjust the operation of the vehicle 10 by controlling one or more components of the vehicle 10. In several embodiments, the control module 126 may be configured to control the boom assembly 28 by transmitting respective control commands to actuate each actuator 56A, 56B, 58A, 58B, 60A, 60B, 70, 74, 78, 80 to a defined position to maintain the boom assembly 28 at the defined position relative to the ground 20.

In several embodiments, the computing system 102 may also automatically control the operation of the user interface 24 to provide an operator notification associated with the determined one or more operating parameters or conditions of the boom assembly 28. For instance, in some embodiments, the computing system 102 may control the operation of the user interface 24 in a manner that causes data associated with the determined one or more operating parameters or conditions of the boom assembly 28 to be presented to the operator of the vehicle 10, such as by presenting raw or processed data associated with the one or more operating parameters or conditions of the boom assembly 28 including numerical values, graphs, maps, and/or any other suitable visual indicators.

Moreover, as shown in FIG. 4, the computing system 102 may also include a communications interface 128 to communicate with any of the various other system components described herein. For instance, one or more communicative links or interfaces (e.g., one or more data buses and/or wireless connections) may be provided between the communications interface 128 and the input device(s) to allow data transmitted from the input device(s) to be received by the computing system 102. Additionally, as shown in FIG. 4, one or more communicative links or interfaces (e.g., one or more data buses and/or wireless connections) may be provided between the communications interface 128 and the actuators 56A, 56B, 58A, 58B, 60A, 60B, 70, 74, 78, 80 to allow the computing system 102 to control the operation of such system components.

Figure 5:
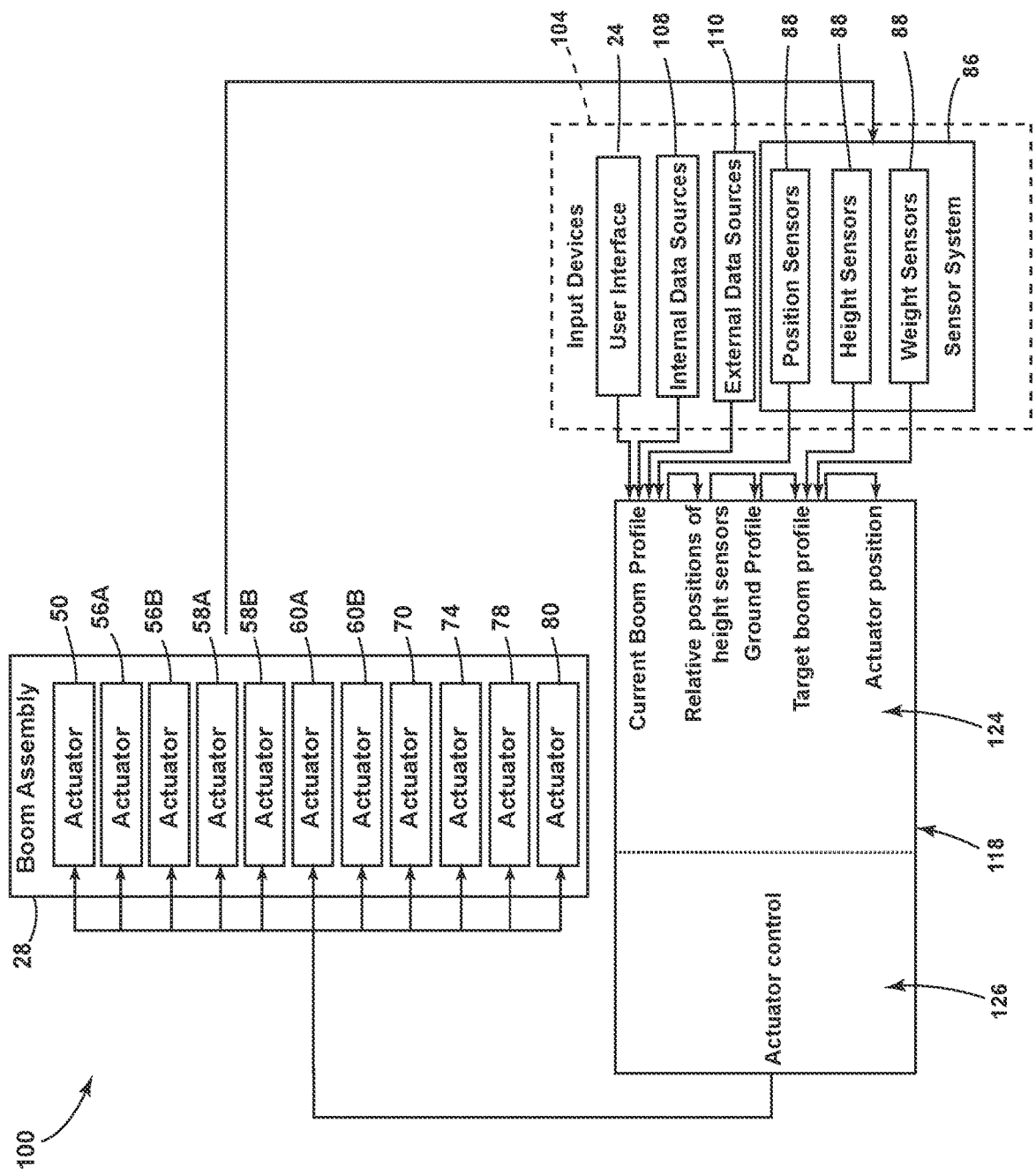
FIG. 5 illustrates a schematic diagram of components of the vehicle system in accordance with aspects of the present subject matter.

Referring to FIG. 5, various components of the system 100 are illustrated in accordance with various aspects of the present disclosure. As shown, the data analysis module 124 may receive data from various components of the system 100, such as via one or more sensors 88, and, in turn, the control module 126 can alter or manipulate the various components, such as the actuators 56A, 56B, 58A, 58B, 60A, 60B, 70, 74, 78, 80 of the boom assembly 28. As provided herein, the data analysis module can receive various inputs and calculate a defined position for each actuator 56A, 56B, 58A, 58B, 60A, 60B, 70, 74, 78, 80 based at least in part on how the remaining actuators 56A, 56B, 58A, 58B, 60A, 60B, 70, 74, 78, 80 may be controlled to maintain the boom assembly 28 at a defined position relative to the ground 20 (FIG. 1). As such, the system 100 can provide the boom assembly 28 with boom height control by calculating a projected target position of each actuator 56A, 56B, 58A, 58B, 60A, 60B, 70, 74, 78, 80 based on a current position of the other actuators 56A, 56B, 58A, 58B, 60A, 60B, 70, 74, 78, 80 and/or a projected target position of the other actuators 56A, 56B, 58A, 58B, 60A, 60B, 70, 74, 78, 80.

As illustrated, the data analysis module 124 may receive the input data from one or more input devices 104. In turn, the system 100 may determine a current boom profile based on boom position data, which may be provided by the position sensors 88 and/or any other source, and defined boom dimensions/a defined boom geometry, which may be received through the input devices 104. Additionally, the system 100 may determine relative positions at various locations along the boom assembly 28 based on boom height data, which may be provided by one or more height sensors 88. In some examples, the system 100 may further calculate a ground profile based on the boom height data. In such instances, the system 100 may project respective lengths from each height sensor to the ground 20 based on the current boom profile.

The system 100 may further determine a target boom profile based on the current ground profile. In various examples, the target boom profile can be based at least partially on a fixed height target and/or a variable height target that provides for a variable height along a defined boom section. In some cases, the variable height target may account for the boom geometry and other constraints and, in turn, determine a target boom profile that places the boom assembly 28 as close as possible to a target height, which may be a minimum defined height between the nozzles along the boom assembly 28 and a target, such as the ground 20.

Further, the system 100 may calculate a defined position for one or more actuators 56A, 56B, 58A, 58B, 60A, 60B, 70, 74, 78, 80 of the boom assembly 28 (e.g., a stroke length for each cylinder) to achieve the defined boom profile. In some instances, the defined position for one or more of the actuators 56A, 56B, 58A, 58B, 60A, 60B, 70, 74, 78, 80 of the boom assembly 28 may be based at least partially on an effect of movement of a first actuator of the one or more actuators 56A, 56B, 58A, 58B, 60A, 60B, 70, 74, 78, 80 on a second actuator of the one or more actuators 56A, 56B, 58A, 58B, 60A, 60B, 70, 74, 78, 80 (or the remaining actuators of the one or more actuators) to maintain the boom assembly 28 at the defined boom profile.

Referring still to FIG. 5, the control module 126 may be configured to adjust the operation of the vehicle 10 by controlling one or more components of the vehicle 10. In several embodiments, the control module 126 may be configured to control the boom assembly 28 by transmitting respective control commands to actuate each actuator 56A, 56B, 58A, 58B, 60A, 60B, 70, 74, 78, 80 to a defined position to maintain the boom assembly 28 at the defined position relative to the ground 20.

In turn, data may be collected by the sensor system 86, which may be provided as subsequent inputs to the data analysis module so that additional alterations to one or more actuators 56A, 56B, 58A, 58B, 60A, 60B, 70, 74, 78, 80 may be made, if needed. In addition, the data analysis module may alter one or more subsequent outputs based on a result of a previous instruction. As such, the data analysis module may learn from the results of previous instructions to alter subsequent instructions.

Figure 6:
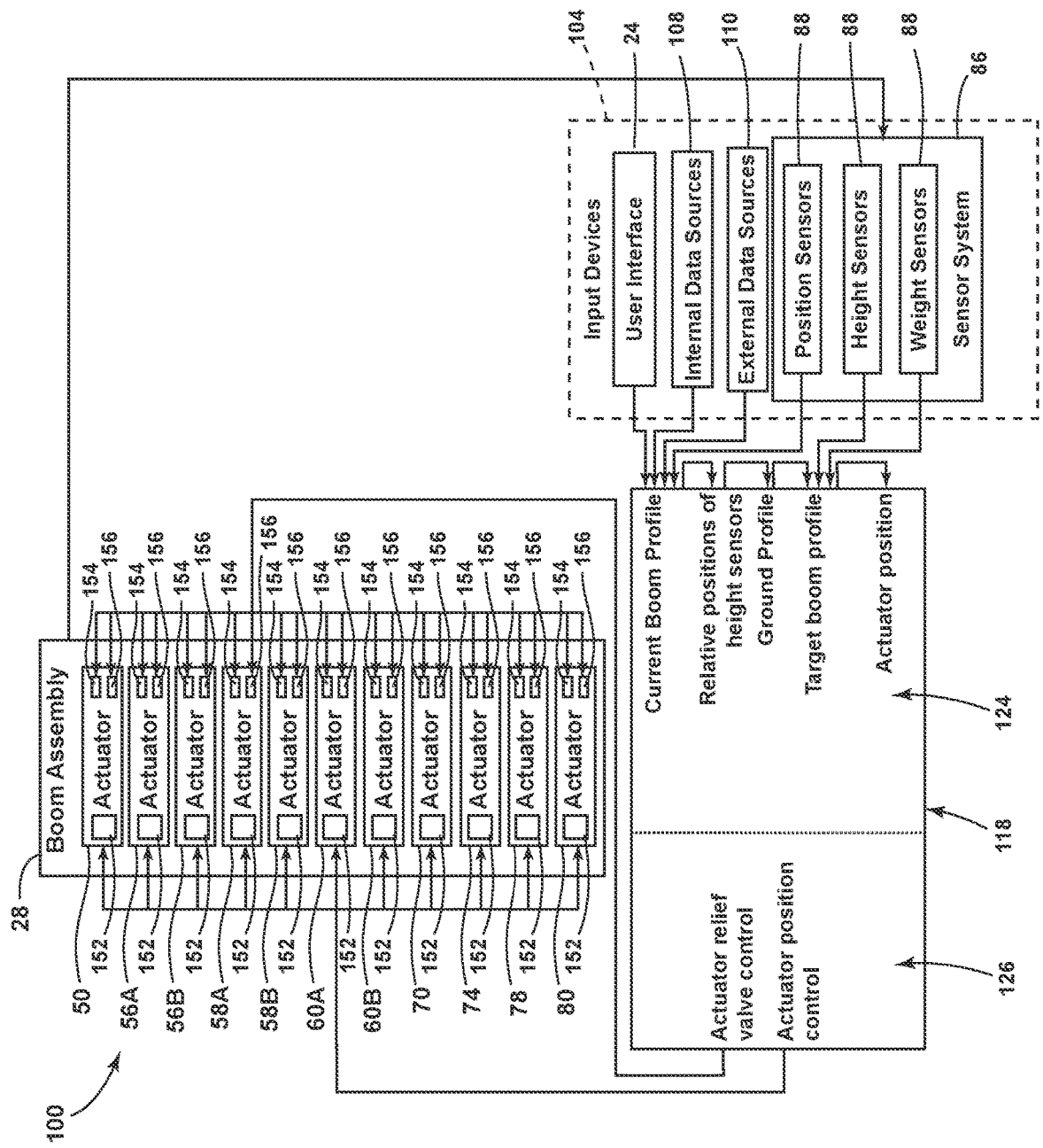
FIG. 6 illustrates a schematic diagram of components of the vehicle system in accordance with aspects of the present subject matter.

Referring to FIGS. 6 and 7, as provided herein, the position of various sections of the boom assembly 28 may be affected due to the movement of various axes 40A, 42A, 46A, 52, 54, 62A, 64A, 66A, 68A. For instance, the boom assembly 28 may be affected by the positions of the various sections relative to the roll axis 54 for the central boom section 34, the lift axis 52 for the central boom section 34, the left main shoulder pivot axis 62A, the right main shoulder pivot axis 64A, a left tertiary shoulder pivot axis 66A, and/or a right tertiary shoulder pivot axis 68A. Additionally or alternatively, in various examples, the boom assembly 28 may be affected by the positions of the various sections relative to one or more yaw-related pivot axes. For instance, the boom assembly 28 may rotate relative to a left yaw axis and/or a right yaw axis, either of which may be affected by one or more of the pivot axes 40A, 42A, 46A, 52, 54, 62A, 64A, 66A, 68A. As such, the actuation of one actuator 56A, 56B, 58A, 58B, 60A, 60B, 70, 74, 78, 80 may impact the manner in which one or more of the other actuators 56A, 56B, 58A, 58B, 60A, 60B, 70, 74, 78, 80 may be controlled to maintain the boom assembly 28 at the defined position relative to the ground 20 and/or at the defined home position relative to the chassis 12. Additionally or alternatively, in various instances, each actuator 56A, 56B, 58A, 58B, 60A, 60B, 70, 74, 78, 80 may be configured to dampen the movement of the boom sections (e.g., in the fore-aft direction and/or in the vertical direction) and to allow the cylinder to absorb energy as opposed to the structure of the boom assembly 28.

In some examples, each actuator (cylinder 140 in FIG. 7 is representative of any one of actuators 50, 56A, 56B, 58A, 58B, 60A, 60B, 70, 74, 78, 80) can be configured as a hydraulically-controlled cylinder. The cylinder 140 may be a single or dual-action cylinder that is responsive to a fluid in a reservoir, such as an oil (hydraulic) or gas (pneumatic). The cylinder 140 can include a piston rod 142 configured to extend and retract with respect to a base housing 144. The cylinder 140 can include a rod port 146 and a base port 148. Fluid from a control circuit 150 fluidly coupled with a reservoir entering the base port 148 (and exiting the rod port 146) causes the piston rod 142 to extend, and fluid from the reservoir entering the rod port 146 (and exiting the base port 148) causes the piston rod 142 to retract.

As illustrated in FIGS. 6 and 7, the control circuit 150 can include a directional control valve 152 that controls the retraction/extension of the associated cylinder 140 and first and second pressure relief assemblies 154, 156 that allow for the pressure within each respective side of the cylinder 140 to be regulated upon reaching a given relief pressure.

In various examples, the control circuit 150 can include a flow valve 158 that may be fluidly coupled with a pressure line 160. A directional control valve 152 may be downstream of the flow valve 158 and may be further fluidly coupled with a tank line 162. As illustrated, a shuttle valve 164 may be downstream of the directional control valve 152. A pair of counterbalance valves 166, 168 may be positioned within the control circuit 150 and respectively coupled with the rod port 146 and the base port 148 of the cylinder 140.

The control circuit 150 may further include the first pressure relief assembly 154 and the second pressure relief assembly 156. The first pressure relief assembly 154 may be fluidly coupled with the rod port 146 of the cylinder 140. In some examples, the first pressure relief assembly 154 can include a pressure sensor 170. Additionally, the first pressure relief assembly 154 can include a first pressure relief valve 172 and a first check valve 174 in parallel. In some cases, the first pressure relief valve 172 can be electronically-controlled to adjust the relief pressure associated with the first pressure relief valve 172. In various examples, the relief pressure may be increased as the cylinder stroke varies from a zero or current position (e.g., mid-stroke).

A first flow control device 176, such as an orifice, may be positioned between the pressure control valve and rod port 146. In several examples, the first flow control device 176 may be configured to vary back pressure between the cylinder 140 and the first relief valve. In some cases, the control circuit 150 may be limited by the time it takes for the computing system 102 and the first relief valve to ramp up to target outputs and/or settings, which may create a lapse of target hydraulic pressure to counteract inertial forces within the boom assembly 28. Once the inertial load is transferred to the cylinder 140, the spike in flow is mitigated by the first flow control device 176 so that the natural back pressure supplements cylinder forces. As such, by combining the first pressure relief valve 172 with the first flow control device 176, a lapse in dampening in any scenario may be mitigated or prevented.

Similarly, the second pressure relief assembly 156 may be operably coupled with the base port 148 of the cylinder 140. In some examples, the second pressure relief assembly 156 can include a pressure sensor 178. Additionally, the second pressure relief assembly 156 can include a second pressure relief valve 180 and a second check valve 182 in parallel. In some cases, the second pressure relief valve 180 can be electronically-controlled to adjust the relief pressure associated with the second pressure relief valve 180. In various examples, the relief pressure may be increased as the cylinder stroke varies from a zero or current position (e.g., mid-stroke).

A second flow control device 184, such as an orifice, may be positioned between the pressure control valve and the base port 148. In several examples, the second flow control device 184 may be configured to vary back pressure between the cylinder 140 and the second relief valve. In some cases, the control circuit 150 may be limited by the time it takes for the computing system 102 and the second relief valve to ramp up to target outputs and/or settings, which may create a lapse of target hydraulic pressure to counteract inertial forces within the boom assembly 28. Once the inertial load is transferred to the cylinder 140, the spike in flow is mitigated by the second flow control device 184 so that the natural back pressure supplements cylinder forces. As such, by combining the second pressure relief valve 180 with the second flow control device 184, a lapse in dampening in any scenario may be mitigated or prevented.

Figure 8:
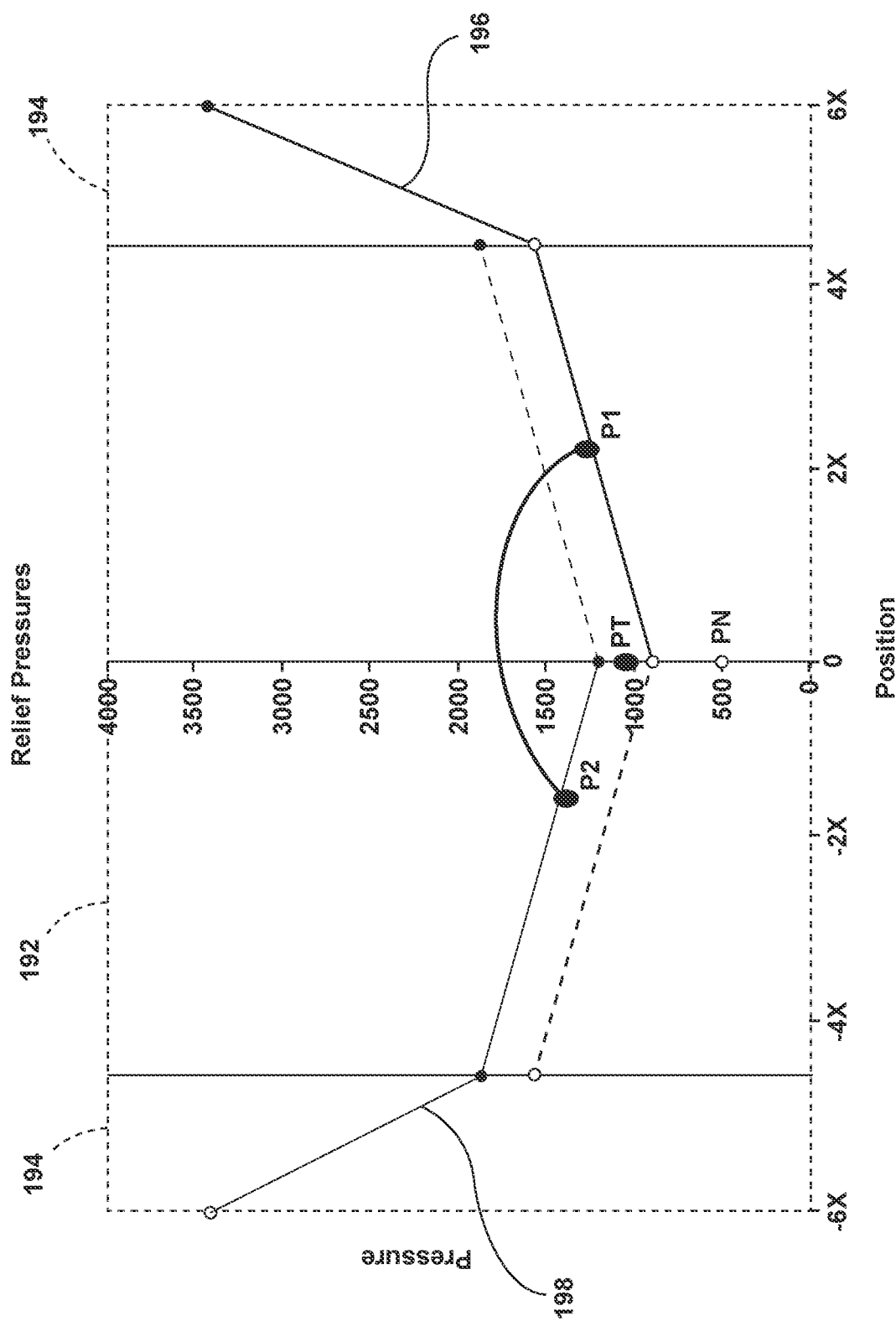
FIG. 8 illustrates a graph of a pressure setpoint for a pressure relief valve of the actuator in accordance with aspects of the present subject matter.

With reference to FIGS. 6-8, in some examples, a rod-side relief pressure setpoint (e.g., pressure curve and/or pressure setting) that is controlled by the first pressure relief assembly 156 may be varied from a base-side relief pressure setpoint (e.g., pressure curve and/or pressure setting) that is controlled by the second pressure relief assembly 156. In some cases, the rod-side relief pressure setpoint and/or the base-side relief pressure setpoint can be established using a stress/strain curve for the boom assembly 28. Moreover, in some cases, the relief pressures for a cylinder 140 may be defined on one side of the piston rod 142 (i.e., only one of a rod-side relief pressure setpoint or a base-side relief pressure setpoint). In various examples, the rod-side relief pressure setpoint and a base-side relief pressure setpoint are independent values, which may only be equal if a cylinder position defines a symmetric position with loads that are also symmetrical.

In some examples, a control circuit 150 fluidly coupled may be operably coupled with a first cylinder 140. A first pressure relief valve 172 can be operably coupled with a rod side of the housing 144. A second pressure relief valve 180 can be operably coupled with a base side of the housing 144. The computing system 102 operably coupled with the first pressure relief valve 172 and the second pressure relief valve 180. The computing system 102 can be configured to determine a pressure setpoint of the first pressure relief valve 172 based at least partially on a positional change to a second cylinder 140 and determine a pressure setpoint of the second pressure relief valve 180 based at least partially on a positional change to the second cylinder 140. Moreover, the control circuit 150 can further include a directional control valve 152 configured to control a position of the first cylinder 140. In some instances, the pressure setpoint of the first pressure relief valve 172 can be based at least partially on a positional change of the first cylinder 140. Similarly, in some instances, the pressure setpoint of the second pressure relief valve 180 can be based at least partially on a positional change of the first cylinder 140.

In some cases, a relief pressure for each relief valve may be calculated according to the following equation (1):

$$P_T = P_N + P_R + P_D + P_S + P_O, \quad (1)$$

wherein $P_T$ is the target relief pressure, $P_N$ is a nominal pressure setting of the relief valve, $P_R$ is a reactionary pressure, $P_D$ is a dynamic pressure, $P_S$ is a steer horn pressure, and $P_O$ is an overrunning pressure.

In various cases, the nominal pressure $P_N$ may be determined through finite element analysis and dynamic analysis. For instance, a maximum force that can be exerted on the cylinder 140 and still have a defined life in the structure it controls may be determined and defined as the nominal pressure $P_N$. As such, the nominal pressure may be based on the boom assembly 28, the vehicle 10, and/or any other factor. Additionally or alternatively, the nominal pressure $P_N$ may be any other defined pressure. In some examples, the weight sensors 88 operably coupled with the boom assembly 28 may monitor the weight of the boom assembly 28 and/or sections thereof. In such instances, the nominal pressure $P_N$ may be intermittently or continuously adjusted based on the detected weight.

In several cases, the reactionary pressure $P_R$ may be a holding pressure required to retain a cylinder 140 in a generally constant position in response to known or intended movement (e.g., accelerations) of other cylinders 140 in a common plane along the boom assembly 28.

In various instances, the reactionary pressure $P_R$ may be determined based on previous reactions of a given cylinder 140 to commands of one or more remote cylinders 140 that is acting in the same plane. In such instances, the reactions may be stored in a look-up table and/or any other form for later usage. In some examples, the reactions can include pressure spikes when the relief valve is set to a generally high pressure, and the displacement of the cylinder 140 if the relief pressure of the relief valve is set to a value near the static load pressure. If deemed severe enough, the pressure spikes relative to the derivative of that command may be plotted. The slope of the plot may be the conversion factor from a command to a responding reactionary pressure $P_R$. Additionally or alternatively, the responding reactionary pressure $P_R$ to a command may be preloaded onto the computing system 102 and/or otherwise detected based on the structure of the boom assembly 28 and/or any detected conditions by the sensor system 86. Furthermore, the reactionary pressure $P_R$ may also be affected by actuators 56A, 56B, 58A, 58B, 60A, 60B, 70, 74, 78, 80 that are not within a common plane. For example, the fold actuators 56A, 56B, 58A, 58B, 60A, 60B can affect the reactionary pressure $P_R$ of the lift actuators. Likewise, the lift actuators 70, 74, 78, 80 can affect the reactionary pressure $P_R$ of the fold actuators 56A, 56B, 58A, 58B, 60A, 60B. As such, the responding reactionary pressure $P_R$ to a command for a cylinder 140 within a separate plane may also be stored in a lookup table. In some cases, the responding reactionary pressure $P_R$ may also be based on a chassis yaw rate, driveline speed changes, and chassis pitch compensation, all of which may also be stored in various lookup tables.

In some cases, the dynamic pressure $P_D$ may be a change (e.g., an increase and/or a decrease) in a relief pressure setting on one side of the cylinder 140 to provide a temporary reaction force to the sum of all other cylinders 140. For example, the dynamic pressure $P_D$ can be determined from one or more look-up tables that maps the reactive pressure change for a cylinder 140 in response to the actuation of one or more additional cylinders 140 positioned along the boom assembly 28. In some cases, the dynamic pressure $P_D$ may be the sum of all reactionary forces $F_D$ of one cylinder 140 required by other cylinders 140 and operations in a common plane, potentially including its control, and changes in chassis status (pitch, braking, acceleration, etc.) For instance, the reaction force $F_D$ may be determined by the following equation (2):

$$F_D = FR_1 + FR_2 + FR_3 + FR_n, \quad (2)$$

wherein $FR_1$ to $FR_n$ are the various reactionary forces that affect the pressure within the cylinder 140. In various examples, the sign (e.g., positive or negative) of $F_D$ determines a side (e.g., rod side or base side) of the cylinder 140 taking the increased force requirement of the sum. Further, the net $P_D$ value for that relief pressure setting may be determined by the following equation (3):

$$P_D = \frac{F_D}{\text{area}}. \quad (3)$$

In some cases, a "delay OFF" timer may be utilized with a decaying signal.

In some cases, the steer horn pressure $P_S$ may be defined as an increase in a relief pressure setting on one or both sides of the cylinder 140 to provide a damping action as the cylinder 140 drifts from the target position. As shown in FIG. 8, the pressure may be generally along a predetermined double-sloped curve with the pressure being a function of cylinder stroke, and a primary and secondary damping rate.

In various examples, the overrunning pressure $P_O$ may be defined as a pressure that is configured to resist an overrunning load in the cylinder 140. In some cases, the overrunning pressure $P_O$ can be a function of comparing either the velocity or net force of a cylinder 140 with a magnitude and a direction of actuator command.

Additionally or alternatively, the pressure setpoint may also consider the pressure PH of hydraulic circuit transients that considers a backpressure, and other pressure drops that can occur during the actuation of the cylinder 140 itself. Moreover, the pressure setpoint may also additionally or alternatively consider a velocity pressure that increases a pressure value of a cylinder 140 based on the velocity of the cylinder 140, which may mimic the response of a typical damper.

Referring further to FIG. 8, the cylinder 140 may include respective bumpers 188, 190 (FIG. 7) at a minimum defined stroke and a maximum defined stroke that is configured to mitigate damage to the cylinder 140 should such positions be reached by the cylinder 140. The first and second pressure relief assemblies 154, 156 may be generally configured to maintain the position of the cylinder 140 within a damper region, which is illustrated by 192, and is positioned between a pair of bumper regions, which are illustrated as 194.

As shown, when a pressure setpoint is equal to a summation of the nominal pressure $P_N$ and the dynamic pressure $P_D$, a first relief pressure value may be chosen along line 196 and a second relief pressure value may be chosen along line 198. In some cases, when the current pressure deviates from the pressure setpoint, the deviation may be along line 196 when the position of the piston rod 142 moves from a defined position PT in a first direction and along line 198 to position P1. To return the piston rod 142 to the defined position, the pressure setting of the first relief valve may be altered. In response, the position of the piston rod 142 may move to a second position as shown by P2 in FIG. 8. As such, the pressure setting of the second relief valve may be altered to assist the piston rod 142 in returning to the appropriate target position. As such, the pressure setting of the first pressure relief assembly 154 and the pressure setting of the second pressure relief assembly 156 may intermittently be adjusted to assist in maintaining each cylinder 140 in a defined position.

Figure 9:
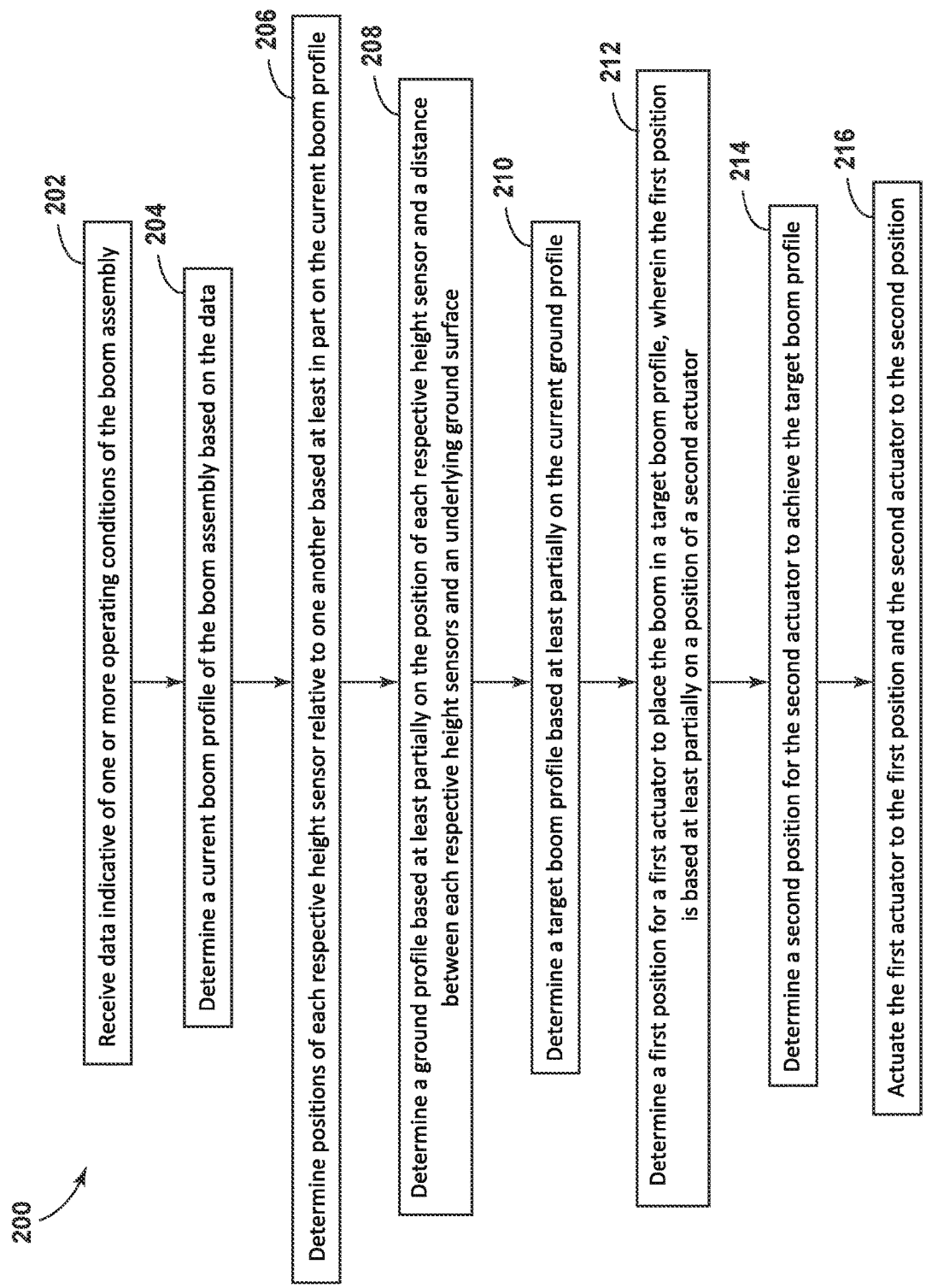
FIG. 9 illustrates a flow diagram of a method for an operation of a system for a boom assembly in accordance with aspects of the present subject matter.

Referring now to FIG. 9, a flow diagram of some embodiments of a method 200 for an operation of a system for a boom assembly is illustrated in accordance with aspects of the present subject matter. In general, the method 200 will be described herein with reference to the vehicle 10 and the system 100 described above with reference to FIGS. 1-8. However, the disclosed method 200 may generally be utilized with any suitable vehicle 10 and/or may be utilized in connection with a system having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 can include receiving data indicative of one or more operating conditions of the boom assembly from a sensor system. In general, the sensor system may be configured to capture data indicative of one or more operating conditions or parameters associated with the performance and/or operation of the vehicle, a system operably coupled with the vehicle, an assembly operably coupled with the vehicle, such as the boom assembly. The sensor system may include one or more sensors, a weather station, and/or any other assembly, which may be installed on the vehicle and/or the boom assembly.

At (204), the method 200 can include determining a current boom profile of the boom assembly based on the data with a computing system. The current boom profile can be based on boom position data provided by the sensor system (e.g., position sensors) and/or defined boom dimensions/a defined boom geometry.

In some cases, the sensor system can include one or more height sensors. In such instances, the method 200, at (206), can include determining the positions of each respective height sensor relative to one another based at least in part on the current boom profile with the computing system.

At (208), the method 200 can include determining a ground profile based at least partially on the position of each respective height sensor and a distance between each respective height sensors and an underlying ground with the computing system.

At (210), the method 200 can include determining a target boom profile based at least partially on the current ground profile with the computing system. In various examples, the target boom profile can be based at least partially on a fixed height target and/or a variable height target that provides for a variable height along the boom section. In some cases, the variable height target may account for the boom geometry and other constraints and, in turn, determine a target boom profile that places the boom assembly as close as possible to a target height, which may be a minimum defined height between the nozzles along the boom assembly and a target, such as the ground.

At (212), the method 200 can include determining a first position for a first actuator to place the boom in a target boom profile with the computing system. The first position is based at least partially on a position of a second actuator. At (214), the method 200 can include determining a second position for the second actuator to achieve the target boom profile with the computing system. In some cases, the position of the first actuator is based at least partially on the change to the second actuator, and the position of the second actuator is based at least partially on the change to the first actuator.

At (216), the method 200 can include actuating the first actuator to the first position and the second actuator to the second position with a hydraulic system. In some cases, each actuator may be a hydraulic cylinder that may be driven via an independent hydraulic control circuit.

Figure 10:
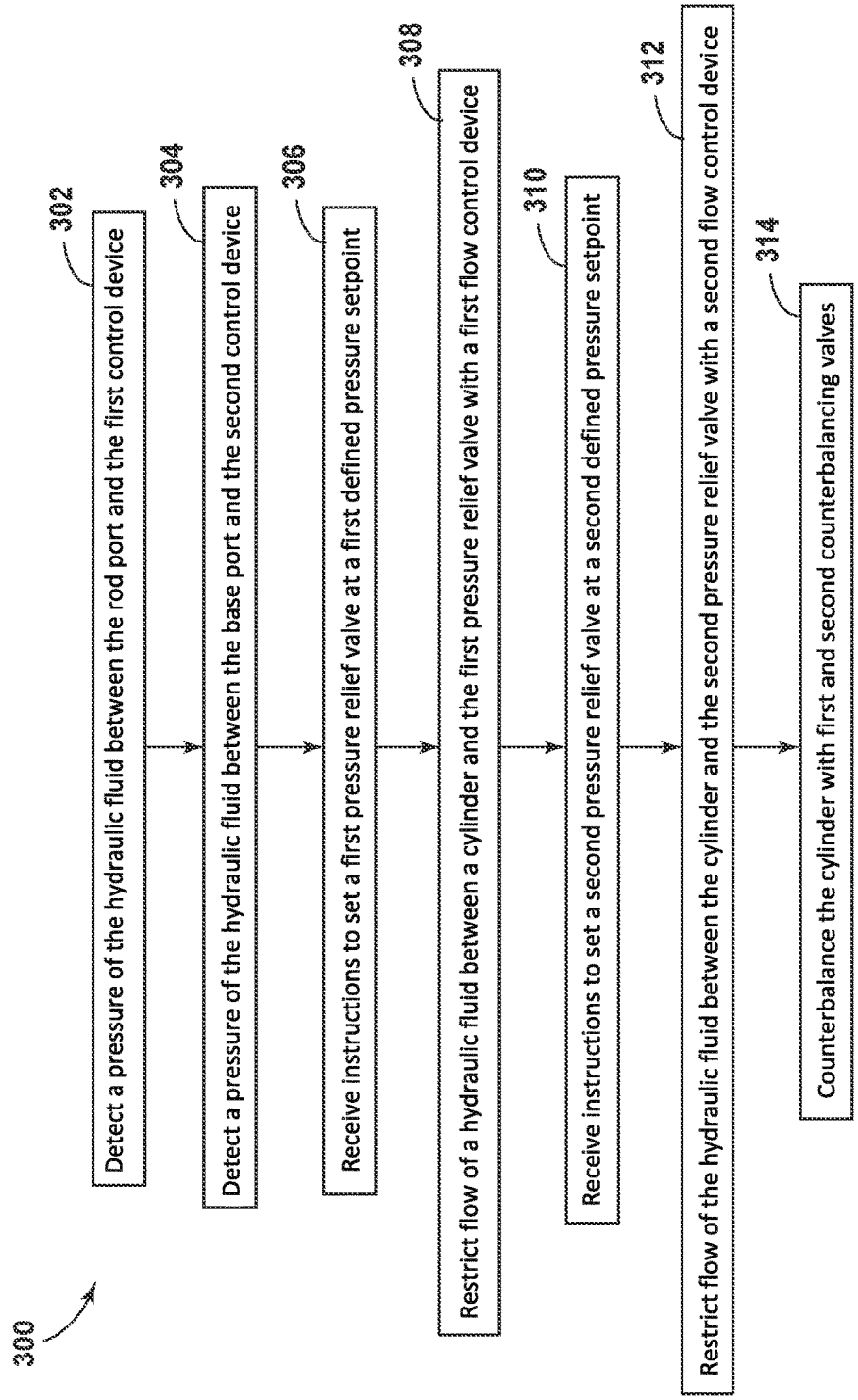
FIG. 10 illustrates a flow diagram of a method for an operation of a system for a boom assembly in accordance with aspects of the present subject matter.

Referring now to FIG. 10, a flow diagram of some embodiments of a method 340 for the operation of a system for a boom assembly is illustrated in accordance with aspects of the present subject matter. In general, the method 340 will be described herein with reference to the vehicle 10 and the system 100 described above with reference to FIGS. 1-8. However, the disclosed method 340 may generally be utilized with any suitable vehicle 10 and/or may be utilized in connection with a system having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (302), the method 300 can include detecting a pressure of the hydraulic fluid between the rod port and the first control device with a first sensor. Similarly, at (304), the method 300 can include detecting a pressure of the hydraulic fluid between the base port and the second control device with a second sensor.

At (306), the method 300 can include receiving instructions to set a first pressure relief valve at a first defined pressure setpoint from a computing system. At (308), the method 300 can include restricting the flow of a hydraulic fluid between a cylinder and the first pressure relief valve with a first flow control device.

Similarly, at (310), the method 300 can include receiving instructions to set a second pressure relief valve at a second defined pressure setpoint from the computing system. At (312), the method 300 can include restricting the flow of the hydraulic fluid between the cylinder and the second pressure relief valve with a second flow control device. In some examples, the first control device and the first pressure relief valve are fluidly coupled with a rod port of the cylinder, and the second control device and the second pressure relief valve are fluidly coupled with a base port of the cylinder.

At (314), the method 300 can include counterbalancing the cylinder with first and second counterbalancing valves. In some examples, the first counterbalancing valve is in parallel with the first control device and the second counterbalancing valve is in parallel with the second control device.

Figure 11:
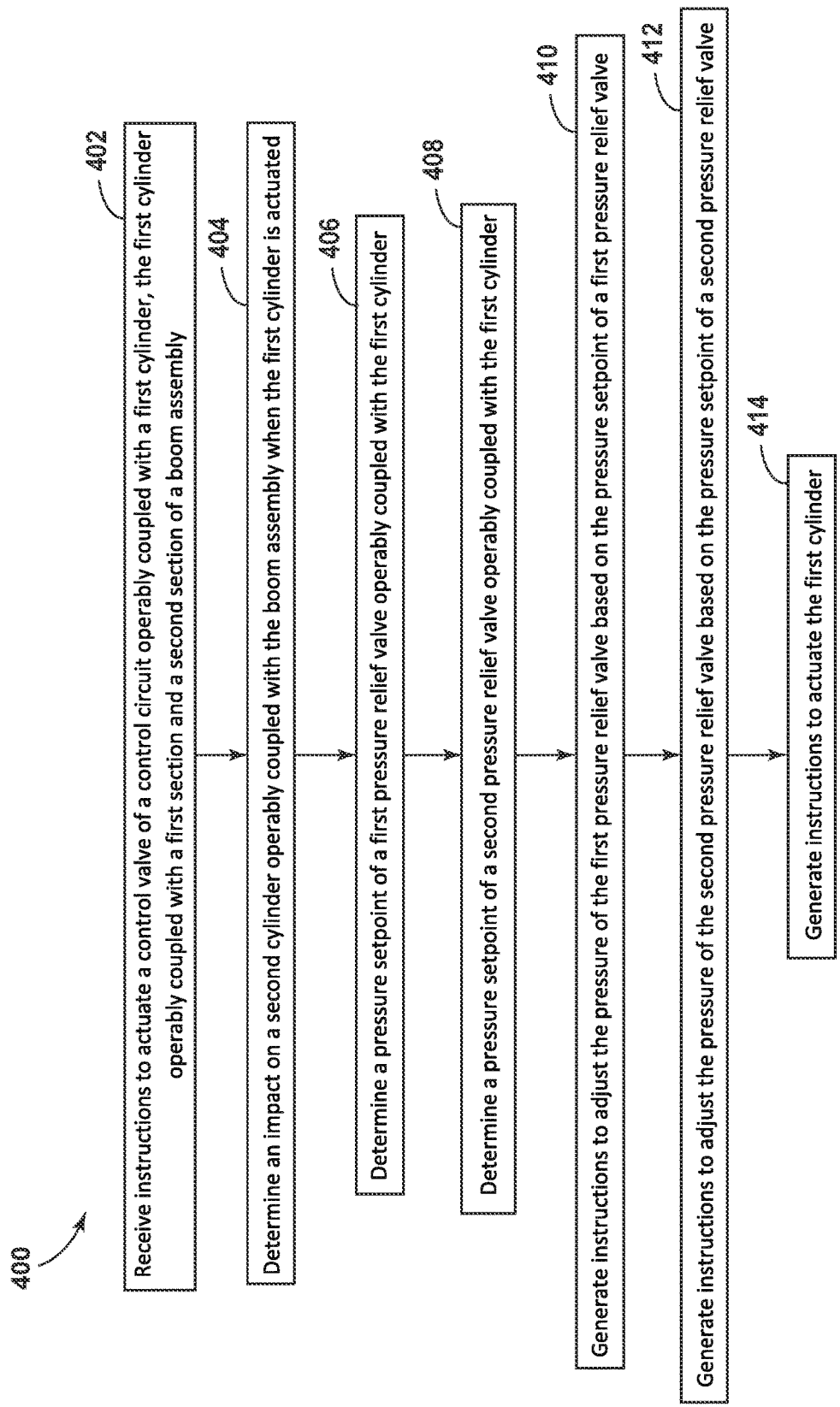
FIG. 11 illustrates a flow diagram of a method for an operation of a system for a boom assembly in accordance with aspects of the present subject matter.

Referring now to FIG. 11, a flow diagram of some embodiments of a method 400 for an operation of a system for a boom assembly is illustrated in accordance with aspects of the present subject matter. In general, the method 400 will be described herein with reference to the vehicle 10 and the system 100 described above with reference to FIGS. 1-8. However, the disclosed method 400 may generally be utilized with any suitable vehicle 10 and/or may be utilized in connection with a system having any other suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated, at (402), the method 400 can include receiving instructions from a computing system to actuate a control valve of a control circuit operably coupled with a first cylinder. In some instances, the first cylinder is operably coupled with a first section and a second section of a boom assembly. At (404), the method 400 can include determining an impact on a second cylinder operably coupled with the boom assembly when the first cylinder is actuated with the computing system.

At (406), the method 400 can include determining a pressure setpoint of a first pressure relief valve operably coupled with the first cylinder with the computing system. In various examples, the pressure setpoint of a first pressure relief valve is based at least partially on a nominal pressure and a dynamic pressure of a port side of the cylinder. Additionally or alternatively, the pressure setpoint of a first pressure relief valve is based at least partially on an overrunning pressure that is configured to resist an overrunning load in the port side of the cylinder.

At (408), the method 400 can include determining a pressure setpoint of a second pressure relief valve operably coupled with the first cylinder with the computing system.

At (410), the method 400 can include generating instructions to adjust the pressure of the first pressure relief valve based on the pressure setpoint of a first pressure relief valve with the computing system. Similarly, at (412), the method 400 can include generating instructions to adjust the pressure of the second pressure relief valve based on the pressure setpoint of a second pressure relief valve with the computing system.

At (414), the method 400 can include generating instructions to actuate the first cylinder with the computing system. As provided herein, the cylinder may be configured as a fold actuator, a lift actuator, and/or any other type of actuator.

In various examples, the methods 200, 340, 400 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the adjustment model. In some instances, the vehicle learning engine may allow for changes to the adjustment model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a boom assembly comprising:
a cylinder operably coupled between a first boom section and a second boom section of the boom assembly; and
a control circuit fluidly coupled with the cylinder, the control circuit comprising:
a first pressure relief assembly including a first pressure relief valve, a first flow control device positioned between the cylinder and the first pressure relief valve in the control circuit, and a first check valve in parallel with the first flow control device.

2. The system of claim 1, wherein the first pressure relief valve is electronically-controlled to adjust a relief pressure associated with the first pressure relief valve.

3. The system of claim 1, wherein the first flow control device is configured as a first restrictive orifice that creates a back pressure between the cylinder and the first restrictive orifice.

4. The system of claim 1, wherein the first pressure relief assembly further includes a first pressure sensor fluidly coupled between the cylinder and the first flow control device.

5. The system of claim 1, wherein the control circuit further comprises:
a second pressure relief assembly including a second pressure relief valve and a second flow control device, the second flow control device positioned between the cylinder and the second pressure relief valve in the control circuit.

6. The system of claim 5, wherein the second pressure relief valve is electronically-controlled to adjust a relief pressure associated with the second pressure relief valve.

7. The system of claim 5, wherein the second flow control device is configured as a second restrictive orifice that creates a back pressure between the cylinder and the second restrictive orifice.

8. The system of claim 5, wherein the first pressure relief assembly is fluidly coupled with a rod port of the cylinder and the second pressure relief assembly is fluidly coupled with a base port of the cylinder.

9. The system of claim 5, wherein a pressure setpoint of the first pressure relief valve and a pressure setpoint of the second pressure relief valve are based at least partially on data provided by a sensor system operably coupled with the control circuit.

10. A method for an operation of a system for a boom assembly, the method comprising:
receiving, from a computing system, instructions to set a first pressure relief valve at a first defined pressure setpoint;
restricting flow of a hydraulic fluid between a cylinder and the first pressure relief valve with a first flow control device;
receiving, from the computing system, instructions to set a second pressure relief valve at a second defined pressure setpoint; and
restricting flow of the hydraulic fluid between the cylinder and the second pressure relief valve with a second flow control device.

11. The method of claim 10, wherein the first flow control device and the first pressure relief valve are fluidly coupled with a rod port of the cylinder and the second flow control device and the second pressure relief valve are fluidly coupled with a base port of the cylinder.

12. The method of claim 10, further comprising:
counterbalancing the cylinder with first and second counterbalancing valves, wherein the first counterbalancing valve is in parallel with the first flow control device and the second counterbalancing valve is in parallel with the second flow control device.

13. The method of claim 11, further comprising:
detecting, with a first sensor, a pressure of the hydraulic fluid between a rod port and the first flow control device.

14. The method of claim 11, further comprising:
detecting, with a second sensor, a pressure of the hydraulic fluid between the base port and the second flow control device.

15. A system comprising:
a cylinder operably coupled between a first boom section and a second boom section of a boom assembly;
a control circuit fluidly coupled with the cylinder, the control circuit comprising:
a first pressure relief valve; and
a first restrictive orifice positioned between the cylinder and the first pressure relief valve; and
a first pressure sensor fluidly coupled between the cylinder and the first pressure relief valve.

16. The system of claim 15, wherein the control circuit further comprises:
a second pressure relief valve; and
a second restrictive orifice positioned between the cylinder and the second pressure relief valve.

17. The system of claim 16, wherein the first restrictive orifice is fluidly coupled with a rod port of the cylinder and the second restrictive orifice is fluidly coupled with a base port of the cylinder.

18. The system of claim 17, wherein the first pressure sensor is positioned between the rod port and the first restrictive orifice.

19. The system of claim 17, wherein the control circuit further comprises:
a second pressure sensor positioned between the base port and the second restrictive orifice.

* * * * *